Oct. 13, 1964   J. W. SPRAUER   3,153,104
COOLING BY RECIRCULATED PRODUCT IN DIFFUSION FLAME PROCESS
FOR PRODUCTION OF ACETYLENE AND ETHYLENE
Filed March 22, 1961   4 Sheets-Sheet 1

INVENTOR
JEROME W. SPRAUER

BY
ATTORNEY

INVENTOR
JEROME W. SPRAUER

BY

ATTORNEY

United States Patent Office 3,153,104
Patented Oct. 13, 1964

3,153,104
COOLING BY RECIRCULATED PRODUCT IN DIFFUSION FLAME PROCESS FOR PRODUCTION OF ACETYLENE AND ETHYLENE
Jerome W. Sprauer, Wilmington, Del., assignor to E. I. du Pont de Nemours and Company, Wilmington, Del., a corporation of Delaware
Filed Mar. 22, 1961, Ser. No. 97,663
2 Claims. (Cl. 260—679)

This invention relates to the production of unsaturated hydrocarbons, and more particularly, it relates to the production of a gas mixture containing as essential ingredients acetylene and ethylene from a hydrocarbon material having a higher degree of saturation than said combined acetylene and ethylene.

It is well known to produce acetylene and/or ethylene by pyrolysis of a saturated hydrocarbon cracking stock. Various methods have been described for supplying the necessary energy to a hydrocarbon stream to effect cracking and dehydrogenation. For example, the hydrocarbon may be pyrolyzed by heat transfer through solid containing walls; or the hydrocarbon may be pyrolyzed by contact with preheated solid bodies. Also, the hydrocarbon may be pyrolyzed by various types of electric discharge. Also, the hydrocarbon may be pyrolyzed by mixing with a preheated carrier gas, such as steam.

A number of recent variations have been described for production of acetylene and ethylene by mixing hydrocarbons with a hot combustion gas. These have been called "precombustion" processes; that is, a fuel is burned to substantial completion to produce a hot combustion gas with which a hydrocarbon cracking stock is then mixed to produce acetylene and ethylene.

In a related process, which has found wide commercial application in the production of acetylene, a hydrocarbon cracking stock, in excess, which serves also as combustion fuel, and oxygen are premixed and then ignited and burned in a stable flame zone. This may be termed a "partial combustion" process.

There is substantial difference between "precombustion" and "partial combustion" processes, which it is here desired to delineate. In the partial combustion processes all of the hydrocarbon, serving either as cracking stock or combustion fuel, passes through the flame zone and is uniformly heated to the flame temperature. In the precombustion processes the fuel may be of different composition than the cracking stock; the cracking stock is mixed downstream from the flame zone and does not come under direct influence of the flame; the cracking stock is not uniformly heated to given temperature but is subjected to a complicated time-temperature history during the mixing operation, the manner of mixing being therefore rather critical.

A process which has characteristics of both the "precombustion" processes and the "partial combustion" processes is that which occurs in a diffusion flame. In a diffusion flame, hydrocarbon and oxygen are separately fed to the flame zone which is comprised of the burning contiguous surfaces of the oxygen and hydrocarbon. The excess hydrocarbon does not pass through the flame zone and is not uniformly heated to a given temperature, as in the partial combustion process; yet the excess hydrocarbon comes into more intimate contact with the flame, depending upon the manner of feed to the diffusion flame, than in the precombustion process. The diffusion flame avoids premixing problems of preignition or flashback and the like and permits wide latitude in preheat temperature and hydrocarbon-oxygen proportion.

A diffusion flame process for the production of acetylene and ethylene has capabilities of substantially improved production and low-cost operation. Previously known processes for the production of such unsaturated hydrocarbons by a diffusion flame process have not been fully satisfactory mainly because of the necessity of using expensive refractory apparatus in order to be capable of withstanding the high temperatures required in efficient operation of such flame processes.

It is an object of this invention to provide a new and improved diffusion flame process for the production of acetylene and ethylene from a more saturated hydrocarbon, i.e., one having a higher degree of saturation than the combined acetylene and ethylene.

It is another object of this invention to provide a diffusion flame process for the pyrolysis production of acetylene and ethylene from a more saturated hydrocarbon which can be operated in inexpensive pyrolysis apparatus.

It is a further object of this invention to provide a diffusion flame process for the pyrolysis production of acetylene and ethylene from a more saturated hydrocarbon in which the pyrolysis apparatus walls may be contact cooled to great advantage.

Yet another object of the invention is to provide a diffusion flame process for the production of acetylene and ethylene from a more saturated hydrocarbon wherein cooled product of the flame recirculates to quench the product passing directly from said flame.

It is also an object of this invention to produce a new and improved diffusion flame burner apparatus.

Other objects of the invention will appear hereinafter.

The objects of this invention may be accomplished, in general, by passing a stream of gaseous hydrocarbon in co-current contiguous relationship with a diffusion flame supported by a stream of an oxygen-bearing gas insufficient for complete combustion of said hydrocarbon whereby to form a gaseous product containing acetylene and ethylene and passing a cooled current of said gaseous product into surrounding contact with the feed streams and product stream passing from said flame. It is preferred that the hydrocarbon and oxygen-bearing gases pass without obstruction into an open space having a cross-sectional area normal to said streams at least 3 times the total cross-sectional area of the said streams.

As will appear in greater detail below, the gaseous hydrocarbon may comprise both the fuel for the diffusion flame and the cracking stock which is to be pyrolyzed to the desired acetylene- and ethylene-containing product. On the other hand, the fuel for the diffusion flame may be a different combustible gas than the hydrocarbon cracking stock.

Hydrocarbon cracking processes for the production of acetylene and ethylene, in general and in common with this invention, may be carried out with any and all aliphatic and alicyclic hydrocarbons which may be fed in the gaseous state. Thus, the term hydrocarbon, sometimes referred to as "more saturated hydrocarbon" as used throughout the specification and claims refers to any gaseous aliphatic or alicyclic hydrocarbon or mixture of hydrocarbons having a higher hydrogen to carbon ratio than that of the mixture of acetylene and ethylene in the product gas. Preferably, primarily for economic reasons, the hydrocarbon feed will consist of one or more of the lower aliphatic saturated hydrocarbons having at least two carbon atoms per molecule, namely, ethane, propane, butane, isobutane, pentanes, hexanes, octanes, nonanes, decanes. Commercial hydrocarbon mixtures derived from petroleum, such as, liquefied petroleum gases or refinery by-product gases are applicable. The process is applicable to methane, but, in general, to obtain attractive yields of acetylene and ethylene by the process of this invention it is desirable that the feed contain substantial proportions of higher hydrocarbons.

As will become apparent, it is possible to exert some control over the ratio of ethylene to acetylene, but, in general, it is impractical by the process of this invention to produce one without the other. In the case where ethylene is not desired, it is feasible to recycle any recovered crude ethylene to the hydrocarbon feed. The process may be operated with pure olefinic hydrocarbon feed, but this is not usually economically attractive.

Optionally, the oxygen-bearing gas stream will consist of oxygen or of air or of mixtures of oxygen and air, namely, enriched air.

It is well known to add steam in various ways in "pre-combustion" processes in order to avoid extreme peak temperatures and to control formation of soot or carbonaceous solids. Similarly, steam may be added to either the hydrocarbon stream or the oxygen-bearing stream in the process of this invention in any amount not interfering with the maintenance of a stable diffusion flame. Other gases, such as hydrogen, nitrogen, carbon monoxide, carbon dioxide, or the like may be contained in either of the feed streams without departing from the spirit of the invention.

Since the pyrolysis of hydrocarbons to acetylene and ethylene is a highly endothermic reaction occurring at high temperature level, the benefit of maximum practical preheat is well known. Preferably, in carrying out the process of this invention the feed streams will be preheated to the maximum extent practical and economical. Usually in commercial metal preheaters the practical preheat temperature is around 500 to 700° C., but with improved materials of construction still higher temperatures may be feasible. Another limitation on preheat may be tendency of the hydrocarbon to form coke on the preheater surfaces, but this is not considered prohibitive at 500 to 700° C. with lower aliphatic hydrocarbons.

The following description, when taken in connection with the accompanying drawings will set forth the invention in greater detail. In the drawings.

Figure 1:
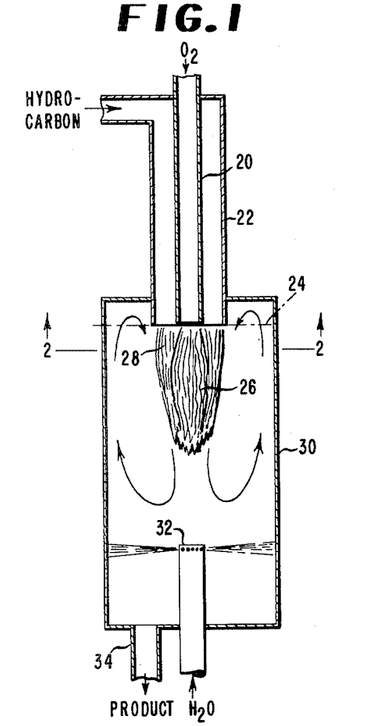
FIGURE 1 is a diagrammatic side elevation view of one embodiment of diffusion flame hydrocarbon pyrolysis apparatus for use in the present invention.
Figure 2:
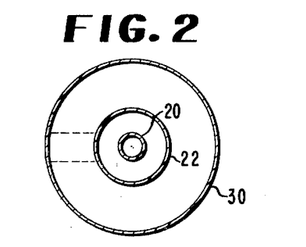
FIGURE 2 is a sectional view taken along the line 2—2 of FIGURE 1.

Referring to FIGURES 1 and 2, 20 designates a central tube and 22 a concentric outer tube both ending in a common plane 24. These tubes function as a diffusion flame burner preferably with an oxygen-bearing gas passing through the tube 20 and a hydrocarbon through tube 22.

Conventional means (not shown) are provided for igniting the hydrocarbon gas issuing from the open port on plane 24. This is commonly done by discharging a high frequency electric spark within the region of the contiguous surfaces of the two feed streams after one feed is turned on and the other feed is being turner on.

Since the hydrocarbon feed is to function both as the flame fuel and as the hydrocarbon to be pyrolyzed, it must be present in excess of the amount that will be consumed by the oxygen-bearing feed.

The diffusion flame 26 and the entrained excess hydrocarbon 28 pass into the central space of reactor 30. As will be noted, the reactor walls are spaced both transversely and longitudinally at some distance from the flame and the pyrolysis zone which latter immediately surrounds the flame.

At flow rates less than sonic speeds, a more or less cylindrical diffusion flame is established at the contiguous surfaces of the two feed streams. The flame, sometimes referred to as the flame zone, is stabilized by the tiny recirculation zone created as a result of the finite thickness of the tubular element separating the hydrocarbon port from the oxygen gas port. This thickness need be no more than a few thousandths of an inch. Under conditions of slow-burning composition, for example, when the oxygen-bearing stream is air or steam-diluted, it is desirable to provide a wider recirculation zone at this rim. Depending upon the velocities of the streams, it is sometimes of small advantage to terminate the central tube a short distance upstream from the termination of the outer tube, but the distance between the termination of the inner tube and the outer tube along the axis of the tubes should be less than twice the inside diameter of the outer tube to avoid overheating of the burner tip.

The optimum relative proportions of the two streams will depend upon their separate composition, the degree of preheat, and the desired product composition, but in any case this is readily determined experimentally. The absolute magnitude of the flows is not critical, but preferably it is selected to give a turbulent flow within the central tube. Preferably, the annular flow is laminar. Thus, with turbulent flow on the central tube and laminar flow on the anulus the visual diffusion flame will extend several burner tube diameters downstream terminating in a slightly enlarged brushy tip with a cross-sectional area intermediate between that of the central and outer burner tubes. Although it is not critical, it is preferred that the maximum thickness of the hydrocarbon stream be less than one or two inches.

It is an essential feature of the invention that the reactor space be substantially larger both transversely and longitudinally than the hot zone in the immediate vicinity of the flame within which the pyrolysis occurs. Thus, the walls are insulated by a cooler gas layer from extreme temperatures of the flame and the actual synthesis zone. By this feature the reactor may be constructed cheaply of nonrefractory metal construction. The walls may even be water-cooled, if desired. The burner itself is cooled by the incoming feeds and will operate practically at the feed preheat temperature. In effect, the flame burns in free space, the synthesis zone being defined and maintained by the kinetic energy of the feed streams. Necessarily the reactor space must be enclosed to collect the product gas. Thus, the flame burns in a surrounding current of partially cooled ambient product gas. The kinetic energy of the entering feed jets sets up a gentle recirculation of product gas counter to the flame flow (as indicated by the arrows in FIGURE 1). This effect of an insulating gas layer between the reactor walls and the hot zone is obtained if the ratio of the cross-sectional area of the reactor to the total cross-sectional area of the feed streams is at least 3.

A further benefit of this method of operation is that the product gas is automatically quenched to preserve the desired acetylene and ethylene products. That is, the kinetic energy of the feed jets results in entrainment of the partially cooled ambient product gas which rapidly lowers the downstream mixed gas temperature. Of course, some ambient product gas is entrained near the feed orifice, but this is apparently a very minor effect interfering to a negligible degree with the hydrocarbon pyrolysis. The spreading cone of turbulent flow results in large entrainment in the vicinity of the visual flame tip at which the reaction is substantially completed and ready for quenching.

The pyrolysis product may, if desired, be additionally quenched with a water quench jet 32 as illustrated. The gas then flows through product outlet 34 from which it is subjected to known separation procedures for recovery of the desired acetylene and ethylene.

I have found that the reaction is quite insensitive to additional quenching downstream from the visual flame tip. Conveniently the product is cooled by a liquid water spray at some convenient distance downstream the flame, as indicated. Gas-quenching, for example, by recycled cool product is entirely feasible. Other quenching schemes may be applied. In any case, quenching at a point where the flame jet retains significant velocity ensures that the recirculated product gas is at least partially cooled. It is immaterial whether the flame is directed upward or downward, but the latter is desired if a liquid water quench is used. Under some circumstances it may be desirable to circulate by mechanical means cooled product gas to the insulating gas layer zone surrounding the pyrolysis zone. Or an inert gas such as nitrogen or steam may be supplied to this space.

It is preferred to operate the concentric tube burner of FIGURE 1, as just described, with oxygen on the central tube. However, it is also feasible to reverse the feeds, that is, to operate with hydrocarbon on the central tube and oxygen on the annulus. In this case, a coaxial cylindrical flame front is formed at the interface of the anular jet and the ambient product gas, but quite desirable chemical conversions and yields may still be obtained.

Figure 3:
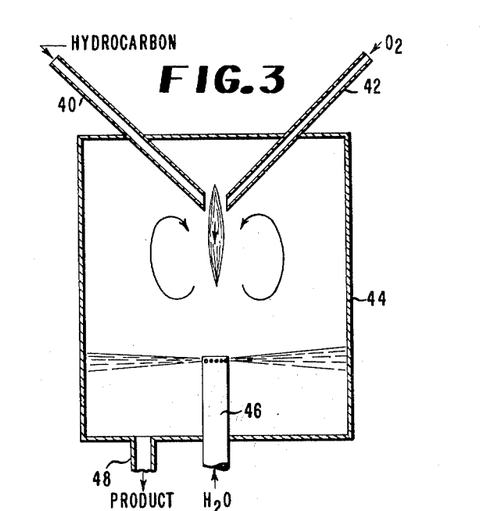
FIGURE 3 is a diagrammatic side elevation view of another embodiment of diffusion flame pyrolysis apparatus.
Figure 4:
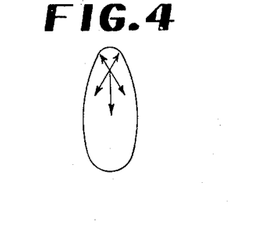
FIGURE 4 is a diagrammatic section in side view of the flame disk of FIGURE 3.

In the embodiment shown in FIGURE 3 a stream of hydrocarbon and a stream of oxygen-bearing gas are directed toward each other through conduits 40 and 42 to cause the two streams to impinge on each other within reactor 44 with a common velocity component in a substantially longitudinal direction of the reactor. Here again the cross-sectional area of the reactor must be at least 3 times the cross-sectional area of the feed streams. Preferably in this embodiment the cross-sectional area of the reactor will be 100 or more times the cross-sectional area of the feed streams. Also, in this embodiment the feed streams preferably will be at high velocity in turbuent flow. The product is thereby partially recirculated in a direction counter-current to the flame direction to surround the gas streams and is then quenched in waterspray 46 and passed from the reactor through outlet 48. Upon ignition (by means not shown) an elliptical, disk-shaped diffusion flame zone is stabilized at the intersection of the axes of the two gas streams, approximately bisecting the angle of impingement. A relatively small difusion flame is stabilized around the oxygen jet upstream from the impingement disk. This, no doubt, serves to stabilize the flame disk, while involving a very small consumption of the oxygen. In such an arrangement the feed gases flow parallel to the flame disk radially from the center of impingement with a large net flow in the direction of the common velocity component of the two jets, as indicated in FIGURE 4. This results in a recirculation pattern of ambient cooled product gas, as indicated by the rotary arrows of FIGURE 3. Here, also, there is an insulating layer of cooler ambient product gas between the reactor walls and the hot zone, and the walls may be nonrefractory metal construction, cooled externally, as required. Here, also, there is automatic quenching by the recirculated, partially cooled product gas.

Figure 5:
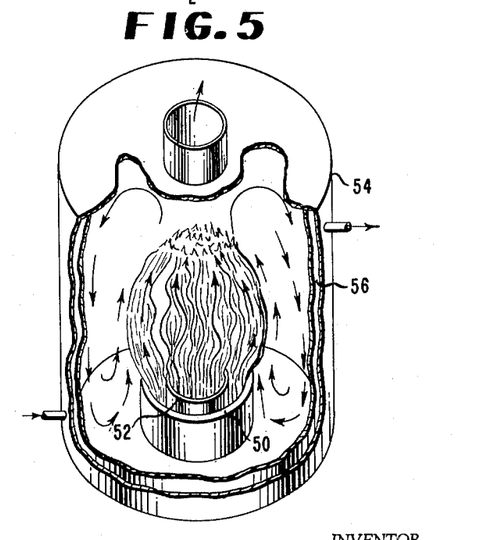
FIGURE 5 is a diagrammatic perspective view of a diffusion flame pyrolysis apparatus showing the flow of the flame and gases.

The embodiment shown in FIGURE 5 illustrates the passage of the hydrocarbon stream from annular tube 50 and oxygen stream from central tube 52, both streams flowing in an upward direction. In order that the flow of gases, flame and products of pyrolysis can be clearly visualized, FIGURE 5 is shown in perspective. Except for the direction of flows in an upward direction this embodiment is very similar to the construction of FIGURE 1. The turbulent flow of the oxygen stream causes an entrainment of the laminar flow of the hydrocarbon stream whereby the excess hydrocarbon is acted upon by the heat of the combustion and the products of the combustion to pyrolyze the same in a matter of milliseconds. The products of the pyrolysis are clearly shown in counter-current circulation to insulate the diffusion flame from the reactor walls which are shown being water-cooled by the water flowing through water jacket 56 around reactor 54.

Figures 6, 7, 8, 9:
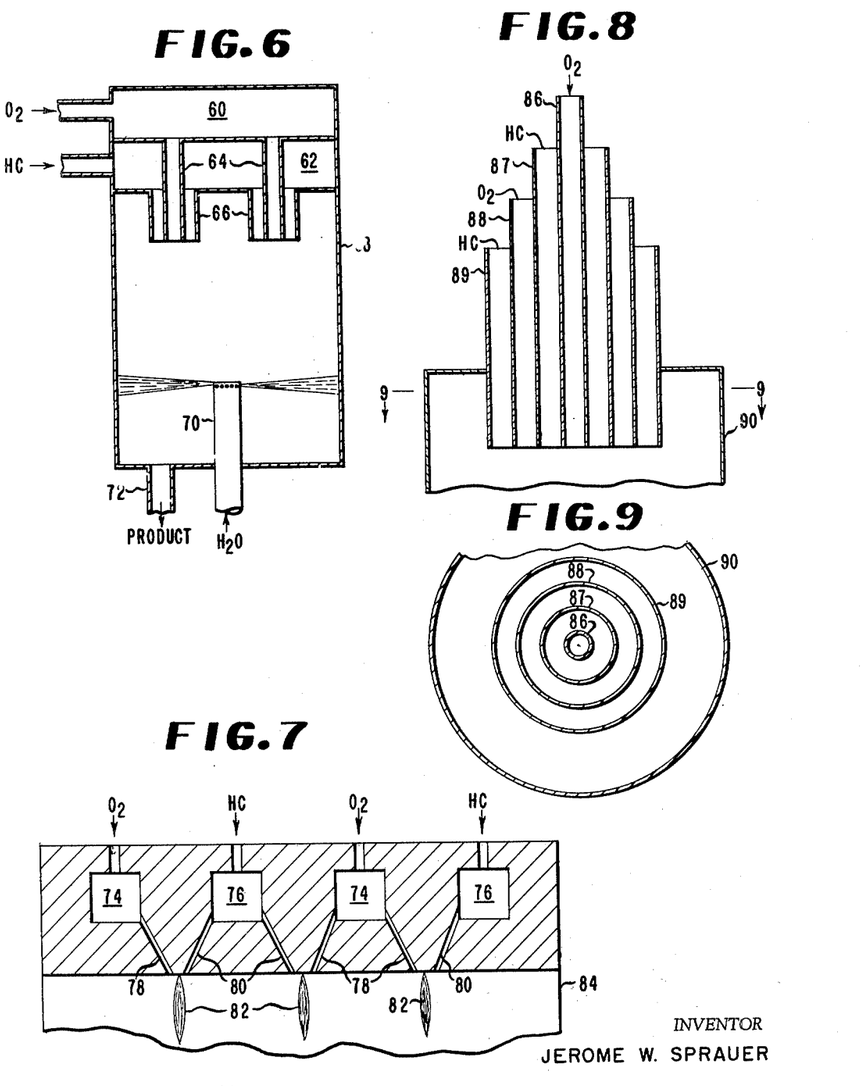
FIGURE 6 is a diagrammatic side elevation view of a multiple diffusion flame pyrolysis apparatus.
FIGURE 7 is a diagrammatic side elevation of a multiple diffusion flame apparatus of the general type shown in FIGURE 3.
FIGURE 8 is still another type of multiple diffusion flame apparatus.
FIGURE 9 is a sectional view taken along the line 9—9 of FIGURE 8.

The multiple diffusion flame pyrolysis apparatus of FIGURE 6 illustrates a common header 60 for oxygen and a common header 62 for hydrocarbon. The central tubes 64 pass through outer tubes 66 to form concentric burner tubes within reactor 68. As many multiple diffusion flames as desired may in this manner be arranged in a common reactor as long as the total cross-sectional area of the reactor is at least 3 times the total cross-sectional area of the co-current streams of hydrocarbon and oxygen. Although a single quench jet 70 is illustrated herein, as many quench jets as desired may be employed. 72 designates the product outlet.

FIGURE 7 illustrates a plurality of impinging stream burners of the type shown in FIGURE 3. In this embodiment the oxygen headers 74 are alternately arranged with hydrocarbon headers 76 to allow for the angularly directed oxygen and hydrocarbon gas tubes 78 and 80 respectively to pass the gases into impinging contact with each other to create a multiple of diffusion flames 82 within reactor 84.

In FIGURES 8 and 9, 86, 87, 88 and 89 designate a series of concentric tubes in which every alternate tube passes a stream of oxygen-bearing gas and a hydrocarbon gas. The concentric tubes are centered in reactor 90 which again has a cross-sectional area at least 3 times as great as the total cross-sectional area of the gas streams. Also, as in all other modifications, the hydrocarbon is present in excess of that which will burn by the support of the oxygen-bearing gas whereby to pyrolyze such excess hydrocarbon and thus synthesize the acetylene and ethylene.

In FIGURES 10 and 11, 92, 93, 94, 95 and 96 designate five parallel rectangular conduits. An oxygen-bearing gas is passed through alternate conduits and a hydrocarbon gas through the other alternate conduits. The nest of conduits is substantially centrally located in a rectangular reactor 98. Such reactor could, if desired, be of round or other configuration as well, it being only necessary that the area of the reatcor be at least 3 times the total area of the emitted gas streams.

Figure 12:
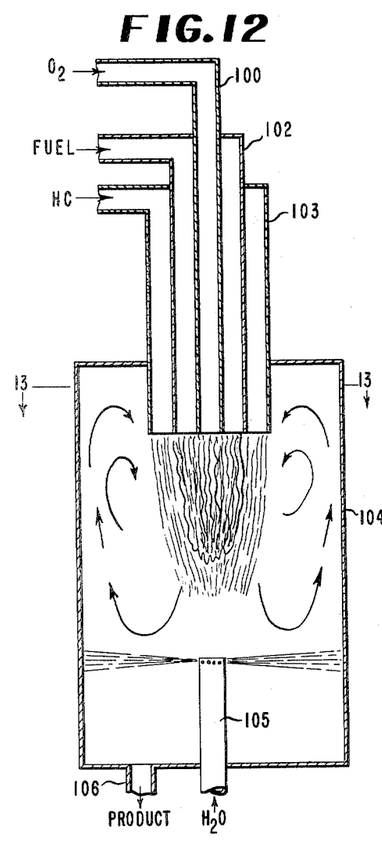
FIGURE 12 is diagrammatic side elevation view of a preferred embodiment of a triple tube diffusion flame apparatus.
Figure 13:
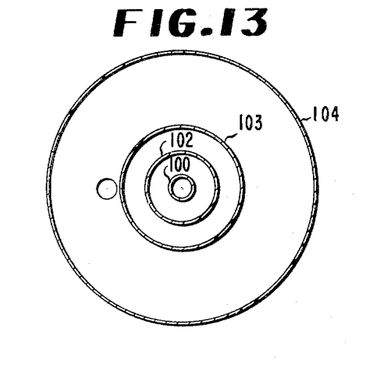
FIGURE 13 is a sectional view taken along the line 13—13 of FIGURE 12.

FIGURES 12 and 13 illustrate a preferred modification in which a triple tube burner is provided whereby an oxygen-bearing gas can support the combustion of a cheap combustible fuel gas and pyrolyze most, or nearly all, of the relatively expensive hydrocarbon gas. In this modification the central tube 100 preferably contains a stream of oxygen-bearing gas, annular tube 102 a cheaper fuel gas and annular tube 103 a hydrocarbon cracking stock. The concentric tubes are substantially centrally located within reactor 104 which is also provided with water quench jet means 105 and outlet 106. It is not essential that the respective feed gases be passed through the particular tubes designated above. The gases may be passed through any of the tubes 100, 102 or 103, it being necessary, however that the oxygen and fuel gases be passed through adjacent tubes. For example, it is perfectly feasible to operate with fuel gas being fed to tube 100, oxygen to 102 and hydrocarbon cracking stock to 103. In such case, two diffusion flames will be stabilized, one on tube 100 and one on tube 102. Other permutations are possible. Here again, the cross-sectional area of the reactor 104 must be at least 3 times as great as the total area of the emitted gas streams.

The fuel-gas may be any hydrogenous and/or carbonaceous gas combustible with oxygen. Preferably, to obtain advantage in this method of operation, the fuel-gas will be cheaper than the cracking stock. For example, one may use natural-gas as the fuel-gas and propane as the cracking stock. Of perhaps greatest interest, is the use as the fuel-gas of a tail-gas remaining after acetylene and ethylene separation from the mixed product gas. Such a gas will comprise hydrogen, carbon monoxide, methane, optionally nitrogen, as major constituents, with possibly lesser amounts of carbon dioxide and higher hydrocarbons depending on how the acetylene and ethylene separation is accomplished.

Preferably, the fuel-gas will be in such proportion as to be equivalent to the oxygen, assuming complete combustion to water and carbon monoxide, but this is not at all critical. Use of more oxygen than equivalent to the fuel-gas will tend to give higher acetylene and ethylene concentration at lower yield, approaching in the limit the performance without fuel-gas feed. One may calculate the heat release and then estimate by known thermochemistry and thermodynamics the proportion of cracking stock that may be pyrolyzed. But in any case optimum proportions of the three can be established empirically.

In the arrangement shown in FIGURES 12 and 13 the oxygen stream is preferably made turbulent and the other two streams laminar. By this means the fuel and hydrocarbon streams will be more rapidly entrained inwardly toward the oxygen stream. To create a turbulent flow in a tube by high velocity, or a laminar flow by low velocity, is, of course, well understood in the art.

In this arrangement upon ignition a cylindrical diffusion flame is stabilized at the central tube rim. The oxygen mixes and burns first with the fuel-gas, and any excess oxygen then mixes and burns with the cracking stock further downstream. Of course, mixing of all streams commences at the burner port. The speed of mixing will depend upon the relative velocities at the interfaces. In any case, the oxygen and fuel will burn as mixing proceeds. And particularly if the oxygen stream is high velocity and turbulent, the mixing and burning will proceed more or less sequentially.

Figure 10:
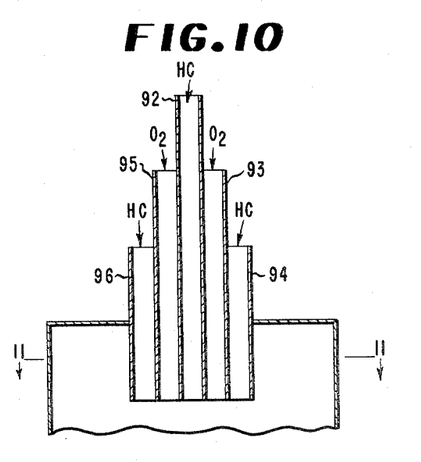
FIGURE 10 is a rectangular type of multiple diffusion flame apparatus.
Figure 11:
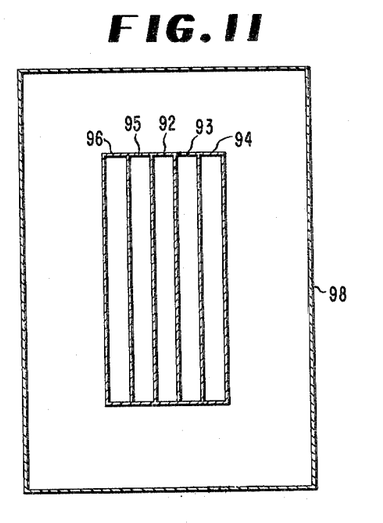
FIGURE 11 is a sectional view taken along the line 11—11 of FIGURE 10.

Similarly, on the multiple slot burners of FIGURES 8 and 10 one may feed alternately in the sequence oxygen, fuel, hydrocarbon, or some other permutation. Preferably the fuel-gas is interposed between the hydrocarbon and the oxygen, and the outer feed will be hydrocarbon; for example, with five adjacent rectangular slots, as in FIGURE 10 one would feed in order from side to side: hydrocarbon, fuel, oxygen, fuel, hydrocarbon.

Figure 14:
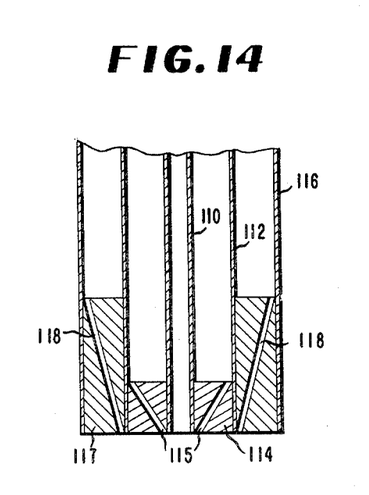
FIGURE 14 is a side sectional view of a modified form of triple tube diffusion flame burner.
Figure 15:
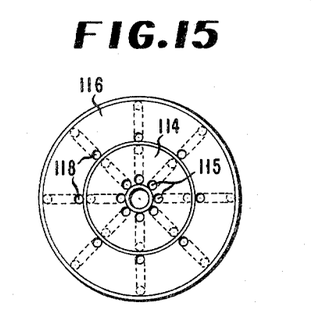
FIGURE 15 is a sectional view taken along line 15—15.

In the modified form of triple tube burner shown in FIGURES 14 and 15 the two annular tubes are baffled to present a plurality of angularly directed conduits arranged to pass the gas streams into impingement with the stream passing from the central tube. Reference numeral 110 designates the central tube through which oxygen is preferably passed. 112 is the inner annular tube containing at the port end a baffle 114 containing a series of holes 115 in converging conical array directed toward the stream issuing from the central tube. 116 designates the outer annular tube which contains at its port end a baffle 117 containing a series of holes 118 in conical array converging toward the central axis at a smaller angle than the holes 115. By this construction the fuel gas from holes 115 is impinged with the oxygen gas with velocity components in the same direction, and hydrocarbon gas is further impinged against the diffusion flame, formed by the oxygen and fuel gas, through holes 118.

Operation of the process of this invention with separately fed fuel-gas realizes at least partially the advantage of "precombustion" processses in supplying the required heat by combustion of a cheaper fuel than the cracking stock. At the same time it avoids any critical mixing problem and retains the benefit of the gas insulating layer between the hot zone and the containing walls and the benefit of automatic quenching.

Moreover, it is believed that the process of this invention benefits because the cracking stock is in intimate contact with the combustion zone before the mixing with combustion gases actually occurs. That is significant thermal energy is transmitted, by radiation and otherwise, to the cracking stock before the bulk mixing occurs. Further, it is felt that significant chemical energy, particularly in the form of atomic hydrogen, may diffuse into the cracking stock ahead of the bulk mixing. Thus, substantial energy may be transmitted before mixing, resulting in the early stage of the pyrolysis proceeding in the absence of combustion products, thereby reducing the localized peak temperatures in the downstream stages where mixing proceeds by virtue of the kinetic energy of the feed streams. Since the pyrolysis is believed to occur by a free radical reaction mechanism, such a transmission of heat and initiating free radicals completely eliminates any induction period, and the entire reaction is completed within a few milliseconds at most. Of course, the practical operation of the process is entirely independent of such theoretical speculation concerning the mechanism.

Any combustion process for production of acetylene and ethylene ("partial combustion," "precombustion" or "diffusion flame," as previously defined) depends upon a combustion reaction for release of thermal energy, in general, by the following net equations:

$$CO + \tfrac{1}{2}O_2 \rightarrow CO_2 + \text{heat}$$

This heat raises the temperature level and provides the heat for the endothermic pyrolysis, according to the following net equations:

$$C_2H_4 \rightleftharpoons C_2H_2 + H_2 - \text{heat}$$

All combustion processes for which adequate data are available involve an unwanted yield and energy loss according to the following net equations:

$$CO + H_2O \rightleftharpoons CO_2 + H_2$$

By a fortunate combination of relative kinetics, the pyrolysis reactions proceed more rapidly than the degradative reaction to carbon monoxide; otherwise the sole carbonaceous product of the reaction would be carbon monoxide. Nonetheless this type of degradation represents a major yield loss.

Also, by a fortunate combination of relative kinetics, the formation of carbon, which may be written:

is relatively slow under prevailing conditions compared to the other pyrolysis reactions. Actually carbon formation represents almost negligible yield loss in the process of this invention. It is further minimized by using lower mixed product gas temperatues, by use of tempering steam in either feed stream or use of air or enriched air as the oxygen-bearing stream.

Comparison of product compositions by detailed energy and mass balancing indicates, in general, that the water-gas equilibrium is approximately established:

$$CO + H_2O \rightleftharpoons CO_2 + H_2$$

Indeed, this is a reasonable approximation in most combustion processes.

Similarly, the process of this invention results in a fair approach to the acetylene-ethylene equilibrium:

$$C_2H_4 \rightleftharpoons C_2H_2 + H_2$$

Typically the temperature calculated by assumption of this equilibrium will be on the order of 100° C. lower than that indicated by the water-gas equilibrium (above) or the thermal balance. As a corollary of these calculations, one may conclude that the reaction approaches completion with respect to the synthesis reactions, before the entrainment of partially cooled ambient product gas and the resultant quenching becomes a significant factor.

By such calculations one arrives at typical temperatures in the range of 900–1300° C. for the mixed end temperature in the process of this invention. Actual peak temperatures in the flame are, of course, much higher. One may control the end temperature by the oxygen to hydrocarbon feed ratio, more oxygen giving higher temperature, resulting in higher acetylene to ethylene ratio in the product. Practically, a mole ratio of acetylene to ethylene of about 1.5 is readily attained; higher ratios still result in significant yield losses.

Formation of methane constitutes a significant by-product loss, although, in general, methane is present well below equilibrium concentration according to the following equation:

$$C_2H_2 + 3H_2 \rightleftharpoons 2CH_4$$

unless, of course, methane is present in the cracking stock feed.

As a matter of convenience operation at atmospheric pressure or slightly higher is preferred. As is well known, the pyrolysis of more saturated hydrocarbons to acetylene and ethylene is thermodynamically favored by reduced pressure, so operations at less than one atmosphere is feasible and may be desired.

The method chosen for operation of the process of this invention will depend upon complex economic variables and particularly upon the use to which the product gas is to be put. Separation and purification of acetylene and/or ethylene by any combination of known procedures is contemplated. This may be accomplished for example by absorption, adsorption, or other fractionation procedures. Or selective chemical reaction with one or more constituents of the product mixture may be practiced. For example, it is feasible to chlorinate the unsaturated hydrocarbons selectively by addition chlorination over a catalyst, the chlorohydrocarbons being then more readily separated from the residual gas.

In general, highest concentrations of acetylene are obtained using pure oxygen. On the other hand, somewhat better yields are obtained using air. Yields on cracking stock are significantly better using a separately fed fuel-gas. Yields of acetylene plus ethylene tend to decrease at high acetylene to ethylene ratio, and correspondingly the oxygen consumption tends to increase. These generalizations and others are specifically illustrated by the following examples.

*Example 1*

An apparatus similar to that illustrated in FIGURE 3 was employed in which the feed jets were 1.5 mm. I.D. (inside diameter) quartz tubes impinging at an angle of about 90° with about 8 mm. spacing between feed ports, the containing vessel being cylindrical 22 mm. I.D. Liquid water-spray quench was positioned about 10 mm. below the intersection of the axes of the jets.

The feed streams were:

| Stream | Feed | Rate, gm.-mole/min. | Preheat, ° C. |
|---|---|---|---|
| 1 | $C_2H_6$ | 0.0524 | 560 |
| 2 | $O_2$ | 0.0524 | 600 |

The quenched product gas was analyzed (dry basis) at:

| | Mole percent |
|---|---|
| $C_2H_2$ | 8.4 |
| $C_2H_4$ | 6.5 |
| $C_2H_6$ | 2.5 |
| $CH_4$ | 3.4 |
| $CO$ | 27 |
| $CO_2$ | 5.7 |
| $H_2$ | 45 |
| | 98 |

All gas compositions in this and following examples are reported as mole percent.

Negligible soot or carbonaceous tars were produced. The failure of analyzed components to account for the whole gas can be attributed to cumulative analytical error, principally resulting from imprecision in analysis of CO and $H_2$.

One may calculate the following ratios as criteria of the performance:

Cracking stock disappearance, percent ____________ 93
Conversion to $C_2H_2$, percent (i.e., based upon carbon content or moles $C_2H_2$ produced/mole $C_2H_6$ fed × 100) ______________________________ 24
Conversion to $C_2H_4$, percent ____________ 18
Unsaturate ($C_2H_4 + C_2H_2$) yield (i.e., moles $C_2H_2$ plus $C_2H_4$ produced/mole $C_2H_6$ disappearing × 100) ______________________________ 45
Oxygen consumption, moles/mole ethylene + acetylene (i.e., moles $O_2$ fed/moles $C_2H_2$ plus $C_2H_4$ produced) ______________________________ 2.4

In general, all conversions and yields reported in this and following examples are based upon the carbon content of the cracking stock.

*Example 2*

A burner similar to that of FIGURE 1 was operated with the flame directed upwards. The burner was constructed of quartz with concentric tubes of the following dimensions:

| Tube | I.D., mm. | O.D., mm. |
|---|---|---|
| Central | 1.5 | 3.0 |
| Outer | 4.1 | 6.1 |

The reactor walls containing the flame were 22 mm. I.D. No quenching was used other than the cooling obtained by natural convection from the uninsulated reactor walls.

The feed streams at about 545° C. preheat were:

| Tube | Feed | Rate, gm.-mole/min. |
|---|---|---|
| Central | $O_2$ | 0.0163 |
| | $H_2O$ | 0.0134 |
| Outer | $C_3H_8$ | 0.0179 |

Product composition was observed as 6.5% $C_2H_2$, 7.5% $C_2H_4$, 0.3% $C_2H_6$, 8.8% $C_3H_8$.

The following performance ratios were observed:

Cracking stock disappearance, percent _____________ 72
Conversion to $C_2H_2$, percent (i.e., based upon carbon content, in other words, moles $C_2H_2$ produced/mole $C_3H_8$ fed×⅔×100) _____________ 14
Conversion to $C_2H_4$, percent _____________ 16
Unsaturate yield, percent _____________ 42
Oxygen consumption moles/mole ethylene+acetylene _____________ 2.0

*Example 3*

An apparatus similar to that of FIGURE 12 was operated with upward flame, uninsulated walls, and convection cooling. The apparatus was constructed of concentric quartz tubes of the following dimensions:

| Tube | I.D., mm. | O.D., mm. |
|---|---|---|
| Central | 1.5 | 3.0 |
| Intermediate | 4.1 | 6.1 |
| Outer | 7.2 | 9.2 |
| Reactor | 22 | 25 |

The feed streams with 565° C. preheat were:

| Tube | Feed | Rate, gm.-mole/min. |
|---|---|---|
| Central | $O_2$ | 0.0163 |
|  | $H_2O$ | 0.0121 |
| Intermediate | $CH_4$ | 0.0067 |
| Outer | $C_3H_8$ | 0.0156 |

Product composition was:

| | Mole percent |
|---|---|
| $C_2H_2$ | 6.9 |
| $C_2H_4$ | 7.4 |
| $C_2H_6$ | 0.4 |
| $C_3H_8$ | 7.9 |
| $CH_4$ | 9.5 |

Performance ratios were:

Cracking stock disappearance, percent ($CH_4$, of course, is considered fuel, not cracking stock) ___ 70
Conversion to $C_2H_2$, percent _____________ 17
Conversion to $C_2H_4$, percent _____________ 19
Unsaturate yield, percent _____________ 52
Oxygen consumption moles/mole ethylene+acetylene _____________ 1.9

*Example 4*

The apparatus described in Example 3 was operated in comparative experiments with varying cracking stock as reported below.

In all cases, the central feed was 0.0386 gm.-mole/min. enriched air containing 43.5% $O_2$.

In all cases, the intermediate annular feed was 0.047 gm.-mole/min. of a simulated tail-gas containing, 17% $H_2$, 17% CO, 5% $CH_4$, 57% $N_2$. This composition approaches that obtained in the product off-gas; that is, it simulates a partial recycle of the expected tail-gas. The carbon content of this fuel is, of course, not counted as cracking stock.

In all cases, the preheat temperature was in the range of 550-570° C.

Results were:

*Example 5*

The apparatus described in Example 3 was operated with the following feed streams preheated to 600° C.

| Tube | Feed | Rate, gm.-mole/min. |
|---|---|---|
| Central | $O_2$ | 0.0179 |
| Intermediate | $n-C_4H_{10}$ | 0.0179 |
| Outer | $O_2$ | 0.0134 |

In this case there were three stabilized diffusion flames, one on each burner tube rim.

Product composition was: 8.4% $C_2H_2$, 5.9% $C_2H_4$, 0.1% $C_2H_6$.

Performance ratios were:

Cracking stock disappearence, percent _____________ 100
Conversion to $C_2H_2$, percent _____________ 23
Conversion to $C_2H_4$, percent _____________ 16
Unsaturate yield, percent _____________ 40
Oxygen consumption, moles/mole ethylene+acetylene _____________ 2.2

*Example 6*

A burner with three concentric tubes as illustrated in FIGURE 12 was constructed of Type 304 stainless steel with the following tube dimensions:

| Tube | I.D., inches | O.D., inches |
|---|---|---|
| Central | 0.157 | 0.177 |
| Intermediate | 0.317 | 0.337 |
| Outer | 0.374 | 0.438 |

This was operated in quartz tubular reactor 0.75″ I.D. with uninsulated walls. The reactor walls were constructed of quartz for convenience in operation and observation. They may just as well have been of steel construction, since the bare walls were cooled by natural convection below red heat. A water-spray quench was positioned 5.5 inches from the burner tip.

The feed streams preheated to 530° C. were:

| Tube | Feed | Rate, gm.-mole/min. |
|---|---|---|
| Central | $O_2$ | 0.446 |
| Intermediate | Fuel [1] | 0.380 |
| Outer | $C_2H_6$ | 0.802 |

[1] Simulated tail-gas: 59% $H_2$, 35% CO, 6% $CH_4$.

Product composition was 5.5% $C_2H_2$, 6.5% $C_2H_4$, 6.1% $C_2H_6$.

Performance ratios were:

Cracking stock disappearance, percent _____________ 81
Conversion to $C_2H_2$, percent _____________ 17
Conversion to $C_2H_4$, percent _____________ 20
Unsaturate yield, percent _____________ 46
Oxygen consumption, moles/mole of ethylene+acetylene _____________ 1.2

| No. | Outer Annulus Feed | Hydrocarbon Feed Rate, gm.-mole/min. | Product Composition | | Percent Cracking Stock Disappearance | Percent Conversion | | Percent Unsaturate Yield | Oxygen Consumption in moles per mole ethylene and acetylene [1] |
|---|---|---|---|---|---|---|---|---|---|
| | | | Percent $C_2H_2$ | Percent $C_2H_4$ | | to $C_2H_2$ | to $C_2H_4$ | | |
| A | $C_2H_6$ | 0.0234 | 4.1 | 4.9 | 63 | 19 | 22 | 64 | 1.1 |
| B | $C_3H_8$ | 0.0156 | 4.1 | 4.7 | 71 | 18 | 21 | 56 | 1.2 |
| C | $n-C_4H_{10}$ | 0.0139 | 3.4 | 5.1 | 61 | 15 | 21 | 60 | 1.1 |
| D | $n-C_8H_{18}$ | 0.0054 | 3.4 | 5.6 | 70 | 16 | 25 | 59 | 1.2 |

[1] Based on enriching $O_2$ only, that is, excluding 35% of the oxygen fed, which is derived from air.

Example 7

A burner with three concentric tubes with baffles in the intermediate and outer annuli as shown in detail in FIGURE 14 was constructed of Type 304 stainless steel. This was operated in a 1.4″ I.D. quartz tube reactor with uninsulated walls with a water-spray quench positioned 6″ from the burner port.

Feed streams preheated to 535° C. were:

| Tube | Feed | Rate, gm.-mole/min. |
|---|---|---|
| Central | $O_2$ | 0.482 |
| Intermediate | Fuel [1] | 0.380 |
| Outer | $C_2H_6$ | 0.535 |

[1] Simulated tail-gas: 59% $H_2$, 35% CO, 6% $CH_4$.

Product composition was 6.9% $C_2H_2$, 4.2% $C_2H_4$, 0.2% $C_2H_6$.

Performance ratios were:

Cracking stock disappearance, percent ______ 99
Conversion to $C_2H_2$, percent ______ 25
Conversion to $C_2H_4$, percent ______ 16
Unsaturate yield, percent ______ 41
Oxygen consumption, moles/mole of ethylene+acetylene ______ 2.2

Example 8

The burner of Example 7 was modified by removal of the baffle in the outer annulus. This was operated in a 1.4″ I.D. quartz tube reactor with uninsulated walls with a water-spray quench positioned 10″ from the burner port.

Feed streams preheated to 500° C. were:

| Tube | Feed | Rate, gm.-mole/min. |
|---|---|---|
| Central | Enriched Air, 50% $O_2$ | 0.932 |
| Intermediate | Fuel [1] | 1.86 |
| Outer | $\{C_2H_6$ | 0.312 |
|  | $\{C_2H_4$ | 0.156 |

[1] Simulated tail-gas: 38% $H_2$, 19% CO, 4% $CH_4$, 39% $N_2$.

Product composition was 4.0% $C_2H_2$, 4.1% $C_2H_4$, 0.1% $C_2H_6$.

Performance ratios were:

Cracking stock disappearance, percent ______ 69
Conversion to $C_2H_2$, percent (i.e., mole $C_2H_2$ produced/mole cracking stock fed×100) ______ 29
Conversion to $C_2H_4$, percent (i.e., mole $C_2H_4$ in product/mole cracking stock fed×100) ______ 30
Unsaturate yield, percent (i.e., mole $C_2H_4+C_2H_2$ in product/mole cracking stock disappearing×100) ______ 86

This experiment simulates operation in which ethylene is separated from the product and recycled to the diffusion flame. Since 33% of the cracking stock fed was $C_2H_4$ and since 30% was recovered as such, there was a slight net consumption of $C_2H_4$ in the operation. This could be brought into balance by minor adjustment of the feed proportions.

As noted, the performance ratios are calculated to be consistent with the same values as in the preceding examples. Since net $C_2H_4$ production in this example is slightly negative, it is perhaps more significant to calculate the following ratios:

$C_2H_2$ yield, percent (i.e., mole $C_2H_2$ produced/mole cracking stock disappearing×100) ______ 44
Mole $O_2$ consumed/mole $C_2H_2$ produced (i.e., excluding that derived from air) ______ 2.5

Example 9

A burner with three concentric tubes as illustrated in FIGURE 12 was constructed of Type 304 stainless steel with the following tube dimensions:

| Tube | I.D., inches | O.D., inches |
|---|---|---|
| Central | 0.374 | 0.438 |
| Intermediate | 0.593 | 0.625 |
| Outer | 0.718 | 0.750 |

This was operated in a 1.4″ I.D. quartz tube reactor with uninsulated walls with a water spray quench positioned 9″ from the burner port.

The feed streams preheated to 535° C. were:

| Tube | Feed | Rate, gm.-mole/min. |
|---|---|---|
| Central | Air | 1.07 |
| Intermediate | Nothing |  |
| Outer | $C_2H_6$ | 0.223 |

In this experiment the idle intermediate annulus served as a recirculation zone which stablized the relatively slow-burning flame.

Product composition was 3.4% $C_2H_2$, 3.2% $C_2H_4$, 0.4% $C_2H_6$.

Performance ratios were:

Cracking stock disappearance, percent ______ 97
Conversion to $C_2H_2$, percent ______ 23
Conversion to $C_2H_4$, percent ______ 22
Unsaturate yield, percent ______ 45
Oxygen consumption, moles/mole of ethylene+acetylene ______ 0

Example 10

In an experiment very similar to that described in Example 8, the product gas was examined mass spectrographically for high-boiling trace impurities with the following result:

Mole percent
Methylacetylene/allene ______ Ca. 0.1.
Butadiene ______ Ca. 0.1.
Vinylacetylene ______ Ca. 0.1.
Diacetylene ______ Questionable trace.
Benzene ______ Ca. 0.1.

The production of negligible, if any, diacetylene is characteristic of the process of this invention.

Since it is obvious that many changes and modifications can be made in the above-described details without departing from the nature and spirit of the invention, it is to be understood that the invention is not to be limited to said details except as set forth in the appended claims.

I claim:
1. A process for the production of a gas containing acetylene and ethylene which comprises simultaneously introducing three initially separate streams directly into a diffusion flame reaction zone; the first stream consisting essentially of an oxygen-bearing gas; the second stream consisting essentially of a fuel gas wherein the principal fuel ingredient is a member selected from the group consisting of hydrogen, methane, and mixtures thereof; and the third stream consisting essentially of at least one hydrocarbon selected from the group consisting of ethane, propane, butane, and isobutane; flowing said three streams substantially co-currently into said reaction zone with said second stream initially separating said first stream from said third stream while at the same time coming into substantially complete and continuous contact with both said first stream and said third stream;

the amount of oxygen in said first stream being sufficient for substantially complete combustion of the fuel ingredients in said second stream but insufficient for complete combustion of the combination of both said fuel ingredients and the hydrocarbon in said third stream; causing said streams to react in said reaction zone in the form of an unobstructed diffusion flame, the cross-sectional area of said reaction zone normal to said streams being at all points at least three times the total cross-sectional area of said streams; causing resulting product gases to recirculate around said incoming streams in such a manner that product gases circulate outward from the tip of the flame, then backward, then inward toward the incoming streams and finally forward along with the incoming streams to provide an insulating gas layer between the diffusion flame and the structural members of the reaction zone; quenching the product gases issuing from the reaction zone; and separating acetylene from the quenched product.

2. A process for the production of a gas containing acetylene and ethylene which comprises (a) introducing a high velocity, turbulently flowing central stream of oxygen-enriched air directly into a diffusion flame reaction zone; (b) simultaneously introducing directly into said reaction zone, under laminar flow conditions and flowing in a direction substantially co-current with and in a manner substantially surrounding said central stream, an intermediate stream of fuel gas containing at least one member selected from the group consisting of hydrogen and methane as a principal fuel ingredient, each of said streams having been preheated to a temperature of up to about 700° C. and the relative amounts of oxygen and fuel ingredients being introduced by means of said two streams being approximately equivalent based upon complete combustion thereof to carbon monoxide and water, whereby a diffusion flame is maintained extending into said reaction zone; and (c) simultaneously introducing directly into said reaction zone, under laminar flow conditions and in a direction substantially co-current with and in a manner substantially surrounding said intermediate stream, an outer stream of hydrocarbon cracking stock consisting essentially of at least one hydrocarbon selected from the group consisting of ethane, propane, butane and isobutane, said outer stream having been preheated to a temperature of up to about 700° C., whereby said diffusion flame brings about cracking of said hydrocarbon to produce acetylene and ethylene; the cross-sectional area of said reaction zone normal to said streams being at all points at least three times the total cross-sectional area of said streams; causing the resulting product gases to recirculate around said incoming streams in such a manner that product gases circulate outward from the tip of the flame, then backward, then inward toward the incoming streams and finally forward along with the incoming streams to provide an insulating gas layer between the diffusion flame and the structural members of the reaction zone; quenching the product gases issuing from the reaction zone; and separating acetylene from the quenched product.

References Cited in the file of this patent

UNITED STATES PATENTS

| | | |
|---|---|---|
| 2,343,866 | Hincke | Mar. 14, 1944 |
| 2,715,648 | Sachsse et al. | Aug. 16, 1955 |
| 2,789,148 | Schutte | Apr. 16, 1957 |
| 2,800,175 | Sharp | July 23, 1957 |
| 2,823,243 | Robinson | Feb. 11, 1958 |
| 2,833,839 | Lehrer | May 6, 1958 |
| 2,945,074 | Elliott et al. | July 12, 1960 |

FOREIGN PATENTS

| | | |
|---|---|---|
| 544,469 | Belgium | Feb. 15, 1956 |